(12) United States Patent
Bachu et al.

(10) Patent No.: US 9,477,693 B1
(45) Date of Patent: Oct. 25, 2016

(54) AUTOMATED PROTECTION OF A VBA

(71) Applicant: EMC Corporation, Hopkinton, MA (US)

(72) Inventors: Kiran K. Bachu, Cupertino, CA (US); Mark Lonsdale, Redondo Brach, CA (US); Bala Vijayakumar, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 301 days.

(21) Appl. No.: 13/931,458

(22) Filed: Jun. 28, 2013

(51) Int. Cl.
  *G06F 17/30* (2006.01)
(52) U.S. Cl.
  CPC .............................. *G06F 17/30289* (2013.01)
(58) Field of Classification Search
  CPC ........... G06F 11/1456; G06F 11/1464; G06F 9/44505; H04L 67/34; H04L 69/329; H04L 12/1485; H04L 12/1489; H04L 41/147; H04L 47/822; H04L 47/823; H04L 67/1095; H04W 28/10; H04W 4/24
  See application file for complete search history.

(56) References Cited

U.S. PATENT DOCUMENTS

| | | |
|---|---|---|
| 7,139,748 B1 | 11/2006 | Mills et al. |
| 8,135,930 B1 | 3/2012 | Mattox et al. |
| 8,151,263 B1 | 4/2012 | Venkitachalam et al. |
| 8,261,282 B1 | 9/2012 | Ponnapur et al. |
| 8,281,093 B1 | 10/2012 | Krishnan et al. |
| 8,819,369 B1 | 8/2014 | Alappat et al. |
| 8,850,146 B1 | 9/2014 | Majumdar |
| 2005/0125513 A1* | 6/2005 | Sin-Ling Lam et al. ...... 709/220 |
| 2008/0016387 A1 | 1/2008 | Bensinger |
| 2009/0132616 A1* | 5/2009 | Winter et al. ................. 707/204 |
| 2009/0276591 A1* | 11/2009 | Mu et al. ....................... 711/162 |
| 2009/0313447 A1* | 12/2009 | Nguyen .............. G06F 11/1451 711/162 |
| 2010/0011238 A1 | 1/2010 | Nakamura et al. |
| 2010/0299666 A1 | 11/2010 | Agbaria et al. |
| 2011/0087874 A1 | 4/2011 | Timashev et al. |
| 2012/0072685 A1 | 3/2012 | Otani |
| 2012/0084262 A1 | 4/2012 | Dwarampudi et al. |
| 2012/0144229 A1 | 6/2012 | Nadolski |
| 2012/0233282 A1* | 9/2012 | Voccio ................ G06F 9/45558 709/212 |
| 2012/0311580 A1 | 12/2012 | Emelianov et al. |
| 2013/0014103 A1 | 1/2013 | Reuther et al. |
| 2013/0159650 A1 | 6/2013 | Wakamiya |
| 2013/0238867 A1 | 9/2013 | Hayashi |
| 2014/0059375 A1 | 2/2014 | McElhoe et al. |
| 2014/0059539 A1 | 2/2014 | Simonsen et al. |
| 2014/0095816 A1 | 4/2014 | Hsu et al. |
| 2014/0130040 A1 | 5/2014 | Lemanski |
| 2014/0181813 A1 | 6/2014 | Deshpande et al. |

OTHER PUBLICATIONS

U.S. Appl. No. 13/729,249, filed Dec. 28, 2012.
U.S. Appl. No. 13/886,897, filed May 5, 2013.

\* cited by examiner

*Primary Examiner* — Dinku Gebresenbet
(74) *Attorney, Agent, or Firm* — Van Pelt, Yi & James LLP

(57) ABSTRACT

Protecting a first backup application is disclosed. A backup of a state of the first backup application is received. The first backup application coordinates backup of a virtual environment. A second backup application external to the virtual environment is used to store the backup. The backup may be stored in a data storage external to the virtual environment.

19 Claims, 4 Drawing Sheets

AUTOMATED PROTECTION OF A VBA

BACKGROUND OF THE INVENTION

A backup application that provides data protection and backup functionality may become corrupted and fail. In order to recover from errors, a backup application may create backups of itself internally to protect its metadata and configuration data. However, in the event the backup application is completely deleted or destroyed, the backup data of the backup application is destroyed along with the backup application and the backup application is unable to be recovered. Therefore, there exists a need for a better way to protect a backup application.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Backing up a backup application is disclosed. In some embodiments, a backup of a state of a first backup application is received. In some embodiments, the backup includes backup application metadata, data, and configuration checkpoint backup of the first backup application. The first backup application may coordinate backup of a virtual environment. In some embodiments, the first backup application is managed using a virtual environment management platform. A second backup application external to the virtual environment is used to store the backup. In some embodiments, the second application includes a central backup application that manages, instructs, and/or configures the first backup application. The second backup application may replicate the backup to a remote backup storage.

Figure 1:
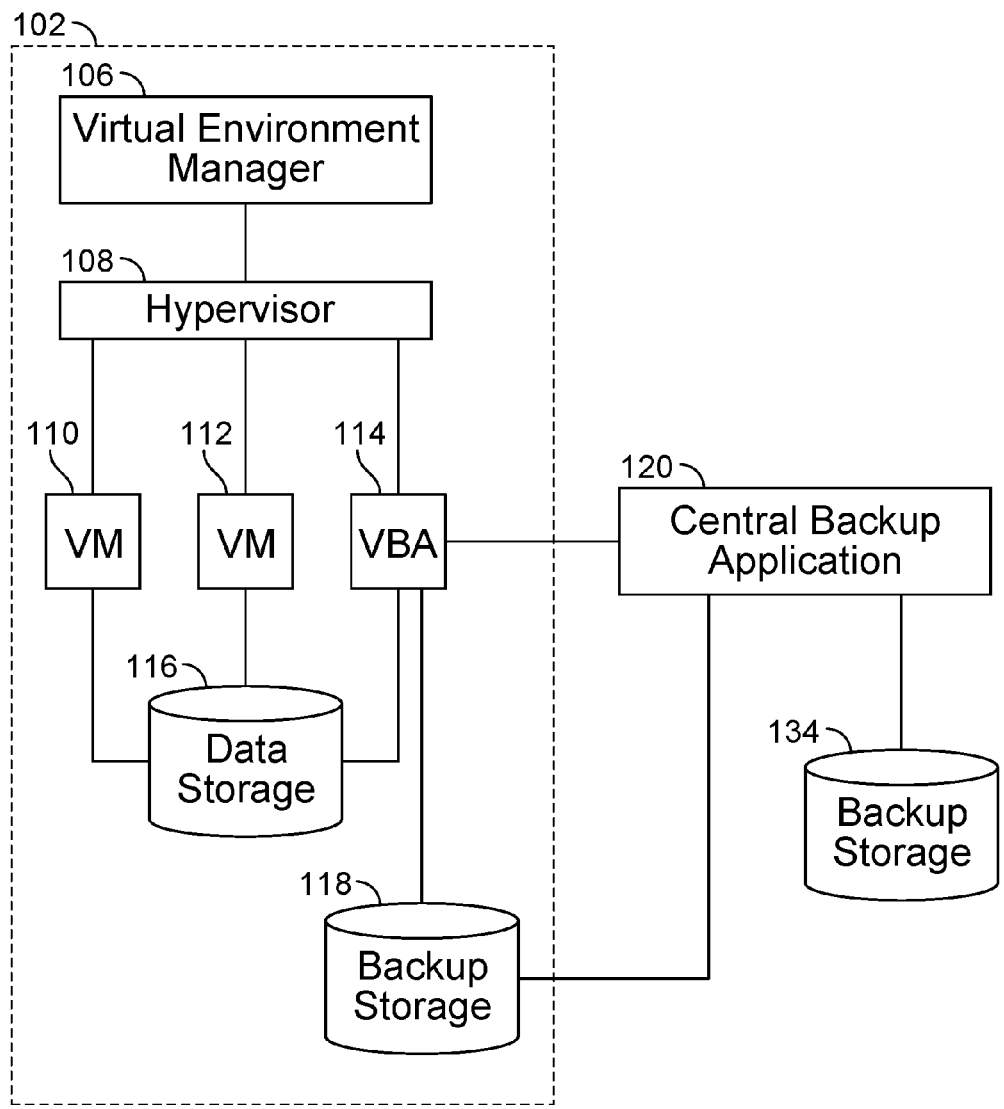
FIG. 1 is a block diagram illustrating an embodiment of a virtual computing and backup environment.

FIG. 1 is a block diagram illustrating an embodiment of a virtual computing and backup environment. Site 102 includes a first virtual environment. Site 102 includes virtual environment manager 106. In some embodiments, virtual environment manager 106 manages a virtual computing environment. For example, virtual environment manager 106 offers a virtual computing environment management platform that can be used to view, configure, deploy, operate, modify, and/or backup a virtual computing environment. A user interface may be offered by virtual environment manager 106 to allow a user to manage the virtual computing environment. The virtual computing environment includes one or more virtual machines. An example of virtual environment manager 106 includes VMware vCenter™ offered by VMware, Inc. of Palo Alto, Calif. Virtual environment manager 106 is connected to hypervisor 108. Hypervisor 108 creates and operates VM (i.e., virtual machine) 110, VM 112, and virtual backup appliance 114. In some embodiments, hypervisor 108 includes an enterprise hypervisor for virtual servers that execute directly on host server hardware without requiring an additional underlying operating system. An example of hypervisor 108 includes VMware ESX and VMware ESXi of VMware, Inc. VM 110, VM 112, and VBA 114 may include a software-implemented abstraction of a hardware. For example, VM 110 and VM 112 each emulates a computer with its own operating system and application. VM 110 and VM 112 may each host a user application/service and/or a server application/service.

VBA 114 is a virtual backup appliance that performs data protection and/or backup of one or more components of the virtual computing environment of site 102. For example, VBA 114 performs backup of VM 110 and VM 112 to backup storage 118. In some embodiments, VBA 114 includes VMware Backup Appliance. In some embodiments, VBA 114 allows native format (e.g., image-based) backup and restore of virtual machines/components. Data storage 116 includes data of VM 110, VM 112, and/or VBA 114. For example, configuration data, operating data, production data, and/or implementation data of VM 110, VM 112 and/or VBA 114 may be stored in data storage 116. In some embodiments, in order to backup a virtual machine such as VM 110, VBA 114 learns about the existence and storage location of the virtual machine using virtual environment manager 106, hypervisor 108 and/or directly from VM 110, and directly accesses the data of the virtual machine to be backed up from data storage 116 to store the backup data to backup storage 118. In some embodiments, VBA 114 is deployed in the virtual computing environment of site 102. For example, VBA 114 is installed/deployed and managed using the virtual environment management platform of virtual environment manager 106. Data to be backed up using VBA 114 may be specified using a user interface of virtual environment manager 106 that controls VBA 114. VBA 114 stores backup data to backup storage 118. Backup storage 118 may perform de-duplication of stored data. An example of backup storage 118 includes EMC Data Domain® Deduplication storage and/or replicator of EMC Corporation of Hopkinton, Mass. VBA 114 may store backup data to other storage locations (e.g., database, tape, etc.).

In some embodiments, VBA 114 performs a backup of its data. For example, VBA 114 checkpoints its metadata, configuration, and any other data that can be used to restore the VBA to a previous checkpoint state. In some embodiments, the metadata includes data about a stored backup data. For example, metadata includes data indicating which data is stored in a backup data, backup versioning information of a stored backup data, replication information about a stored backup data, a time associated with a backup data, retention policy associated with a backup data, and file information associated with a backup data. In some embodiments, the configuration data includes user and data protection policy configuration data. For example, the configuration data includes data indicating user/administrator data protection configuration, how a backup is to be performed, which data is to be protected and backed up, available backup policies, backup policies to be applied to specific data to be backed, when a backup is to be performed, which backup storage/location is to be utilized to store a backup data, and replication of backup data to be performed/maintained.

The checkpoint backup may be performed periodically. In some embodiments, backup/checkpoint of the data of VBA 114 is stored in one or more of the following: an internal storage of VBA 114, data storage 116, backup storage 118, a disk storage, a tape storage, and a storage media. For example, the checkpoint/backup data of VBA 114 is initially stored in an internal storage of VBA 114 or data storage 116 then copied to backup storage 118. The VBA backup data in backup storage 118 may be replicated to other remote storage such as backup storage 134 of central backup application 120 and/or any other remote storage (e.g., storage located at a different site or physical location of site 102).

In some embodiments, central backup application 120 manages data protection, recovery, and/or backup across one or more sites, virtual environments, IT environments, and/or data storage locations/devices. An example of central backup application 120 includes EMC NetWorker™ of EMC Corporation. In some embodiments, EMC NetWorker is a suite of enterprise level data protection software that unifies and automates backup to tape, disk-based, and flash-based storage media across physical and virtual environments for granular and disaster recovery. Cross-platform support is provided for many operating system environments and file systems. EMC NetWorker may manage data zones that contain clients/data to be backed up. The NetWorker management console may provide a graphic user interface for functions such as client configuration, policy settings, schedules, monitoring, reports, and daily operations for de-duplicated and non-de-duplicated backups. In some embodiments, central backup application 120 directly performs backup of data stored in a physical and/or virtual machine/server.

In some embodiments, central backup application 120 provides VBA 114 with one or more data protection policies. For example, VBA 114 may be deployed as a module that communicates and coordinates with central backup application 120 to allow a data protection administrator using central backup application 120 to access, monitor and control any number of VBAs. For example, a data protection policy may be provided to VBA 114 by central backup application 120 to allow a network administrator of site 102 to utilize the policy to backup data of site 102. A data protection policy may specify one or more of the following: how data is to be backed up, when a backup is to be performed, where and type of storage the backup data is to be stored, a retention period of the backup data, where the backup data is to be replicated, retention period(s) of replicated backup data, or which data is to be backed up. In some embodiments, a data protection policy may be associated with a backup of VBA data. For example, the data protection policy specifies how often, when, what, and target location(s) of the metadata, configuration data, and data of the VBA to be backed up.

Central backup application 120 may be a part of site 102 and/or another site. Central backup application 120 may be hosted on a physical server and/or a virtual machine/appliance. Central backup application 120 may manage data protection of a plurality of sites and IT environments. In some embodiments, central backup application 120 manages replication of backup data stored in backup storage 118. For example, according to a backup policy, central backup application 120 manages/facilitates replication of at least a selected portion of contents of backup storage 118 to backup storage 134. Backup storage 134 may perform de-duplication of stored data. An example of backup storage 134 includes EMC Data Domain Deduplication storage and/or replicator of EMC Corporation. In some embodiments, backup storage 134 belongs to a site remote from site 102. In some embodiments, backup storage 134 is a backup storage of central backup application 120 and/or is managed by central backup application 120.

In some embodiments, VBA 114 and central backup application 120 each maintains its own metadata and configuration that is at least in part synchronized. For example, metadata about backup data stored in a backup storage (e.g., backup storage 118) is maintained by both VBA 114 and central backup application 120. Examples of synchronized configuration data includes specification of data protection policies, which data is to be backed up and protected, which backup storage/location is to be utilized to perform a backup for a particular protected data, and how and when a backup is to be performed for a particular protected data. In some embodiments, central backup application 120 instructs VBA 114 to perform a backup of a VM and/or other data of site 102. In some embodiments, when a backup or other action that modifies metadata or configuration data of VBA 114 is performed, a message is provided to central backup application 120 to inform of the change to allow central backup application 120 to update its state. In some embodiments, when an action that modifies metadata or configuration data of central backup application is performed, a message is provided to VBA 114 to inform of the change to allow VBA 114 to update its state. A synchronization communication protocol may be utilized to communicate between VBA 114 and central backup application 120.

In some embodiments, although attempts have been made to synchronize metadata and configuration data of VBA 114 and central backup application 120, the metadata and/or configuration data may become inconsistent over time. In some embodiments, reconciliation is performed by VBA 114 and/or central backup application 120 to reconcile the differences and synchronize the appropriate metadata and configuration data. The reconciliation may be performed on a periodic interval and/or dynamically as needed. In some embodiments, in the event a change to the state corresponds to an inconsistency in a backup data repository of the first backup application, the backup data repository correspondingly is updated to be consistent with the change.

The components shown in FIG. 1 may be implemented in one or more computers, servers, storage devices, networking components, and/or virtual components/networks. Connection between the components may include one or more of the following: a direct or indirect physical communication connection, mobile communication network, Internet, intranet, Local Area Network, Wide Area Network, Storage Area Network, and any other form of connecting two or more systems, components, or storage devices together. For example, site 102 and central backup application 120 may be connected together via a Wide Area Network. Other communication paths may exist and the example of FIG. 1 has been simplified to illustrate the example clearly. Although single instances of components have been shown to simplify the diagram, additional instances of any of the components shown in FIG. 1 may exist. For example, other instances of virtual machines, data stores, backup storages, VBAs, hypervisors, virtual environment managers, and central backup applications may exist. Components not shown in FIG. 1 may also exist.

Figure 2:
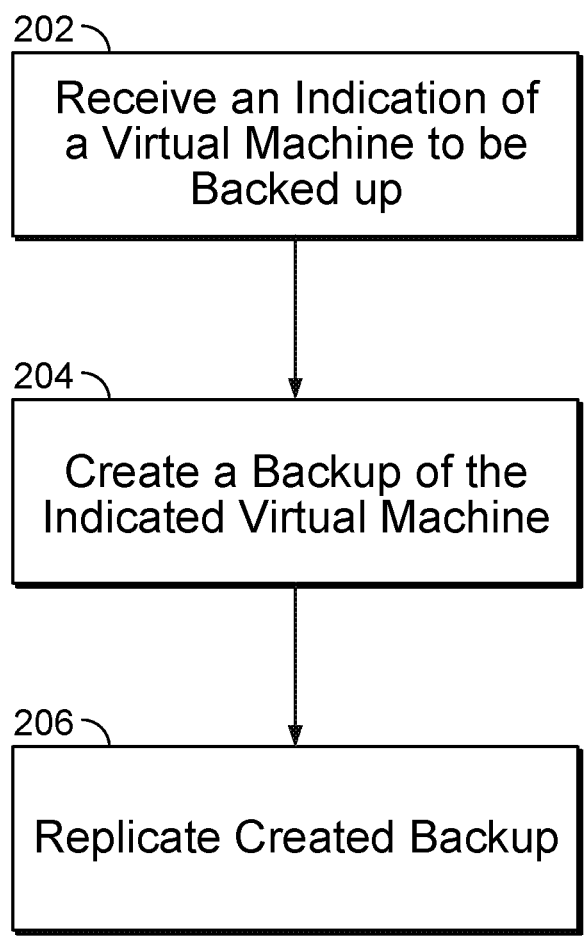
FIG. 2 is a flowchart illustrating an embodiment of a process for creating a backup of a virtual machine.

FIG. 2 is a flowchart illustrating an embodiment of a process for creating a backup of a virtual machine. In some embodiments, at least a portion of the process of FIG. 2 is implemented on central backup application 120 and/or VBA 114 of FIG. 1. In some embodiments, the process of FIG. 2 is performed periodically. For example, a data/virtual machine (VM) to be protected is periodically backed up based on a periodic interval determined based on a data protection policy. The data protection policy for a particular data/VM to be backed up may be specified by a user/administrator for a particular data/VM (e.g., using a user interface of virtual environment manager 106 of FIG. 1) and/or at least in part by a backup application such as central backup application 120 of FIG. 1. In some embodiments, at least a portion of the process of FIG. 2 is performed dynamically. For example, the process of FIG. 2 is performed when a dynamic determination (e.g., based on detection of change to data to be backed up since last backup) is made that a backup should be performed. In some embodiments, at least a portion of the process of FIG. 2 is performed when instructed by a central backup application such as central backup application 120 of FIG. 1.

At 202, an indication of a virtual machine to be backed up is received. In some embodiments, the indication is received via a user interface provided using virtual environment manager 106 of FIG. 1. For example, the indication is received via EMC Backup and Recovery User Interface of VMware vCenter. In some embodiments, the user interface allows a user/administrator to view VMs and virtual environment resources and devices in a hierarchical format (e.g., tree organization) and the user/administrator may graphically explore the hierarchical format to indicate the VM(s)/resources to be backed up. In some embodiments, the indication is associated with a data protection policy. In some embodiments, a selected policy among a plurality of data protection policies (e.g., among received policies from a central backup application such as central backup application 120 of FIG. 1) is selected for the data/VM to be backed up. For example, an administrator selects a selected policy (e.g., platinum policy) among types of available policies (e.g., silver policy-backup to local backup storage only, gold policy-backup to local backup storage and replicate backup to remote storage, platinum policy-backup to local backup storage and replicate to remote backup storage and tape backup) for the specified VM to be backed up. The indication may specify which data/VM to backup, which storage type(s)/locations to store the created backup, type of backup to be performed, when to perform the backup, a retention period of the backup data, where the backup data is to be replicated, a retention period(s) of replicated backup data, and/or any other indication associated with a data protection policy and/or performing a backup. In some embodiments, the indication of the virtual machine to backup is received at a VBA from a central backup application.

At 204, a backup of the indicated VM is created. In some embodiments, creating the backup includes storing at least a portion of data of the VM in a backup storage. In some embodiments, creating the backup includes storing an image of the VM in a backup storage (e.g., performing image-based backup). For example, although the existence and/or data storage location of the VM being backed up may be obtained via a virtual environment manager, hypervisor, and/or directly from the VM, an image of the VM is created from a data storage of the VM (e.g., image of VM 110 is created from data of VM 110 stored in data storage 116 of FIG. 1) without analyzing the contents of the VM (e.g., agent running inside VM is not used and/or contents of the VM is not received from the VM for backup) and the image is stored in a backup storage such as backup storage 118 of FIG. 1. In some embodiments, creating the backup includes storing a file of the VM in a backup storage (e.g., performing file-based backup). In some embodiments, creating the backup includes backing up the entire VM. In an alternative embodiment, only a portion of the VM is backed up. In some embodiments, creating the backup includes storing a backup of the VM in a native format of the VM.

In some embodiments, the backup is created by a VBA such as VBA 114 of FIG. 1. In some embodiments, by directly accessing data of a VM to be backed up from a data storage of the VM rather than via the VM, backup may be performed more efficiently with less processing required by the VM. In an alternative embodiment, creating the backup includes receiving content to be backed up from the VM. For example, guest space backup is performed by an agent running in the VM that provides content/files to be backed up. In some embodiments, creating the backup includes creating the backup according to the data protection policy associated with the VM to be backed up. For example, type(s) of backup storage(s) to be utilized, retention period of the backup data, whether to replicate the backup data to a remote site, retention period of the replicated backup, and/or frequency of the backup may be specified by an associated policy and the policy is followed when creating the backup.

In some embodiments, creating the backup includes communicating with a central backup application 120 (e.g., using a synchronization protocol) regarding the backup performed. For example, VBA 114 performs a backup of VM 110, and VBA 114 informs central backup application 120 regarding the backup (e.g., identification of content backed up, time/version of the backup, location of the backup, etc.) to allow central backup application 120 of FIG. 1 update its metadata/catalog of existing backup data and/or configuration data. VBA 114 may maintain a local catalog/metadata of existing backup data (e.g., updated when backup is performed) and/or configuration data and central backup application 120 may also maintain its own version of the catalog/metadata and/or configuration data that is synchronized with the local catalog/metadata and/or configuration data using indications provided by VBA 114 of FIG. 1. In some embodiments, the created backup is identified as a backup data belonging to a specific site where it was created. In some embodiments, the created backup may be stored at multiple backup storage locations such as a tape, a backup media, a database, and/or any other backup storage medium.

At 206, the created backup is replicated. In some embodiments, step 206 is optional and performed if the backed up VM/data is associated with a data protection policy that indicates the backup of the VM/data should be replicated. In some embodiments, replicating the backup data includes storing at least a portion of the created backup data in a secondary backup storage. The secondary backup storage may be located at a location remote from site 102 of FIG. 1. In some embodiments, replication of the backup data is performed by a central backup application (e.g., central backup application 120) by accessing backup storage directly from the source backup storage (e.g., backup storage 118) to replicate the backup data to another backup storage (e.g., backup storage 134 of FIG. 1). Performing the replication may include de-duplicating the backup (e.g., replicating only the portion of the backup that changed from a prior stored backup). In some embodiments, the replicating the backup includes replicating the backup to a plurality of other storage locations (e.g., to backup storage 134 of FIG. 1). In some embodiments, the replicated backup data is identified as a replicated copy.

Figure 3:
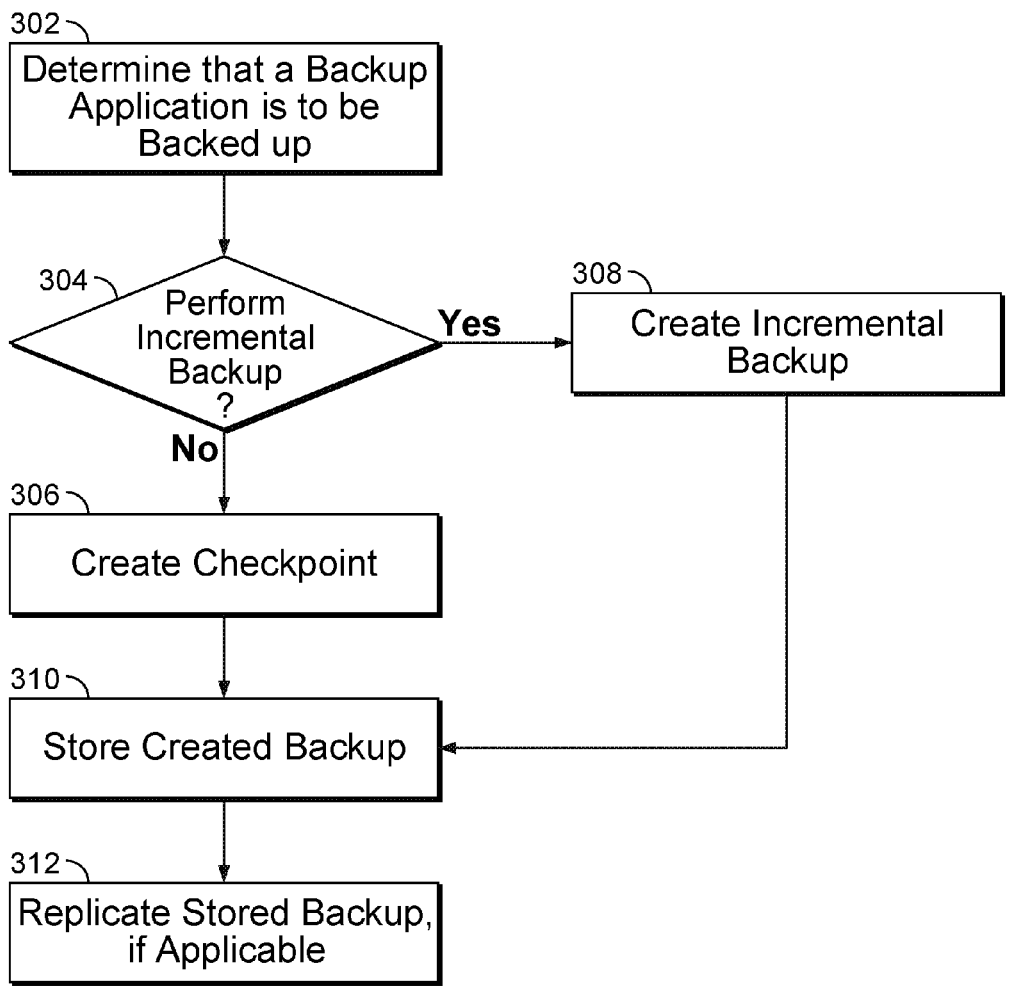
FIG. 3 is a flowchart illustrating an embodiment of a process for protecting a backup application.

FIG. 3 is a flowchart illustrating an embodiment of a process for protecting a backup application. In some embodiments, the process of FIG. 3 is at least in part implemented on VBA 114 and/or central backup application 120. In some embodiments, the backup application protected using the process of FIG. 3 is a backup application that protects data of a virtual computing environment. For example, the backup application protected using the process of FIG. 3 is a virtual backup appliance such as VBA 114 of FIG. 1.

At 302, it is determined that a backup application is to be backed up. In some embodiments, the determination is based on a data protection policy received from a central backup application (e.g., application 120 of FIG. 1) and/or specified by a user/administrator. For example, a backup interval of VBA data is selected by a network administrator using a data protection policy received from a central backup application. In some embodiments, the backup application is protected on a predetermined and/or dynamically determined interval. The interval may be based on a data protection policy specified for the backup application. In some embodiments, the backup application is protected dynamically based on a determined need.

At 304, it is determined whether an incremental backup is to be performed. In some embodiments, determining whether an incremental backup is to be performed includes determining whether a full checkpoint backup or an incremental backup is to be performed. In some embodiments, a full checkpoint backup includes backing up all required data to restore the backup application to the checkpoint state. In some embodiments, an incremental backup includes backing up changes since a last checkpoint backup. For example, in order to restore from an incremental backup, the last checkpoint backup and the incremental backup are both utilized by restoring the backup application to the last checkpoint state, then restoring the backup application to the incremental backup state. In some embodiments, determining whether an incremental backup is to be performed includes determining which type of backup is specified by a data protection policy. For example, the data protection policy may specify when a full checkpoint backup should be performed (e.g., checkpoint backup interval) and when an incremental backup is to be performed (e.g., incremental backup interval). In some embodiments, determining whether an incremental backup is to be performed includes determining a length of time since a last checkpoint backup. For example, if the determined length of time is below a threshold value (e.g., checkpoint backup interval period), it is determined that an incremental backup is to be performed. The threshold value may be predetermined (e.g., specified by a data protection policy) and/or dynamically determined. In an alternative embodiment, only checkpoint backups are performed and incremental backups are not performed.

If at 304 it is determined that an incremental backup is not to be performed, at 306, a checkpoint is created. In some embodiments, creating the checkpoint includes capturing a snapshot of metadata, configuration data, and any other data of the backup application needed to restore the backup application to a valid state at the time of the checkpoint creation. In some embodiments, the metadata includes data about a stored backup data. For example, metadata includes data indicating which data is stored in a backup data, backup versioning information of a stored backup data, replication information about a stored backup data, a time associated with a backup data, retention policy associated with a backup data, and file information associated with a backup data. In some embodiments, the configuration data includes user and data protection policy configuration data. For example, the configuration data includes data indicating user/administrator data protection configuration, how a backup is to be performed, which data is to be protected and backed up, available backup policies, backup policies to be applied to specific data to be backed, when a backup is to be performed, which backup storage/location is to be utilized to store a backup data, and replication of backup data to be performed/maintained.

The checkpoint may be associated with a unique identifier. For example, a unique name, a time stamp, and/or a version of information may be associated with the checkpoint. In some embodiments, the checkpoint is created by a VBA such as VBA 114 of FIG. 1. In some embodiments, the backup application is a virtual machine/appliance and the operating system of the virtual machine/application is not backed up in the checkpoint. For example, the operating system is a standard operating system and the operating system may be restored without the need of the checkpoint. In some embodiments, the contents of the checkpoint may be obtained from backup application memory, internal storage, local storage, and/or production storage of the backup application. In some embodiments, the checkpoint includes a file directory that includes backup files of backup application metadata, configuration data, and other associated data.

If at 304 it is determined that an incremental backup is to be performed, at 308, an incremental backup is created. In some embodiments, the incremental backup includes changes to data of the backup application since a previous checkpoint backup. In some embodiments, the incremental backup includes data identifying changes to metadata, configuration data, and any other data of the backup application needed to restore the backup application since the last previous checkpoint backup. The incremental backup may be associated with a unique identifier. For example, a unique name, time stamp, and/or version information may be associated with the incremental backup. In some embodiments, the incremental backup is created by a VBA such as VBA 114 of FIG. 1. In some embodiments, the contents of the incremental backup may be obtained from backup application memory, internal storage, local storage, and/or production storage of the backup application. In some embodiments, the incremental backup includes a file directory that includes backup files identifying changes to backup application metadata, configuration data, and other data since a previous checkpoint backup.

At 310, the created backup is stored. In some embodiments, either the checkpoint backup created in 306 or the incremental backup created in 308 is stored in a backup storage. In some embodiments, storing the created backup includes storing the created backup under a new file directory that uniquely identifies the created backup and includes contents of the created backup. In some embodiments, the storage location(s) of the created backup is specified by an associated data protection policy. In various embodiments, the created backup is stored in one or more of the following storage: an internal storage of the backup application (e.g., VBA 114 of FIG. 1), virtual environment local data storage (e.g., data storage 116) of the backup application, backup storage of the backup application (e.g., backup storage 118), a disk storage, a tape storage, a de-duplication storage, and a storage media. For example, the checkpoint/backup data of VBA 114 of FIG. 1 is initially stored in an internal storage of VBA 114 or data storage 116 then copied to backup storage 118.

At 312, the stored backup is replicated, if applicable. In some embodiments, the stored backup of the backup application is replicated to another backup storage as specified by an associated data protection policy. For example, the associated data protection policy specifies whether, when, and where the stored backup of the backup application is to be replicated. In some embodiments, the stored backup is replicated to a remote storage that is physically remote from a storage site of stored backup. In some embodiments, the stored backup is replicated to a backup media such as tape. In some embodiments, the stored backup is replicated by a central backup application. For example, central backup application 120 manages replication of VBA backup data in storage 118 to storage 134 of FIG. 1.

Figure 4:
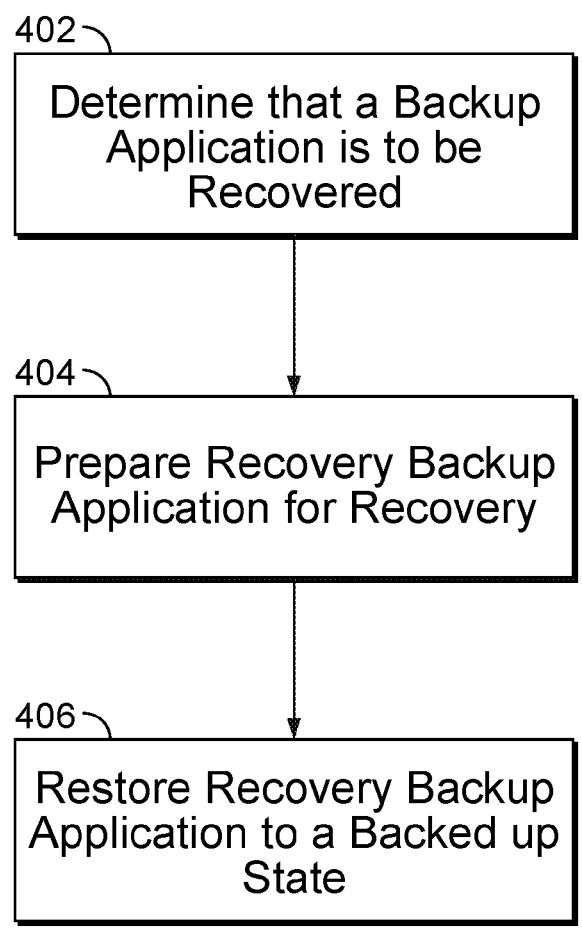
FIG. 4 is a flowchart illustrating an embodiment of a process for recovering a backup application.

FIG. 4 is a flowchart illustrating an embodiment of a process for recovering a backup application. In some embodiments, the process of FIG. 3 is at least in part implemented on VBA 114 and/or central backup application 120. In some embodiments, the backup application recovered using the process of FIG. 4 is a backup application that protects data of a virtual computing environment. For example, the backup application recovered using the process of FIG. 4 is a virtual backup appliance such as VBA 114 of FIG. 1.

At 402, it determined that a backup application is to be recovered. In some embodiments, determining that the backup application is to be recovered includes receiving an indication that the backup has encountered an error. For example, the backup application may have become corrupted, deleted, and/or terminated. In some embodiments, an identification of which state to recover is received. For example, the identification identifies which version, state, checkpoint, incremental backup, and/or time is associated with the recovery state of the backup application to be restored.

At 404, a recovery backup application is prepared for recovery. In some embodiments, preparing the backup application includes launching a new replacement backup application. For example, a new VBA is deployed in the environment of a virtual environment management platform of a virtual environment manager (e.g., manager 106 of FIG. 1). The new VBA may be deployed with an operating system and an application that is ready to accept a backup data for initialization and recovery. In some embodiments, the recovery backup application is the same backup application that is to be recovered and the backup application is placed in a condition to be restored to a previously backed up state. In some embodiments, the recovery backup application may be prepared at least in part by a central backup application such as application 120 of FIG. 1.

At 406, the recovery backup application is restored to a backed up state. In some embodiments, restoring the backup application includes providing the backup application with backup data to be used to restore metadata, configuration data, and/or other data of the backup application. In some embodiments, the provided data includes data saved in step 310 and/or 312 of FIG. 3. In some embodiments, in the event the backup data to be used is a checkpoint backup, the checkpoint backup is provided. In some embodiments, in the event the backup data to be used is an incremental backup, the incremental backup and a basis checkpoint backup of the incremental backup are provided. In some embodiments, which backup data version to be used by the recovery backup application is identified by a received identification and/or configured to be the latest valid backup data version. In some embodiments, a storage location where the backup is obtained may be dynamically determined. For example, if a desired backup data of the backup application cannot be found in a local backup storage (e.g., backup storage 118 of FIG. 1), the backup data is obtained from a storage storing a replicated version (e.g., backup storage 134 of FIG. 1). In some embodiments, the backup application recovery process is managed by a central backup application such as backup application 120 of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for protecting a first backup application, comprising;
    a communication interface configured to receive a backup of a state of the first backup application, wherein the backup of the state of the first backup application includes a checkpoint backup of the first backup application, wherein the first backup application coordinates backup of a virtual environment that includes one or more virtual machines and a data storage associated with the one or more virtual machines, the backup of the state of the first backup application includes an application configuration backup of a configuration of the first backup application, and the backup of the state of the first backup application is separate from a user data content backup generated by the first backup application and stored in the data storage associated with the one or more virtual machines, wherein the backup of the state of the first backup application is stored in a backup storage of the first backup application; and
    using a second backup application external to the virtual environment to synchronize the received backup of the state of the first backup application with a state of the second backup application.

2. The system of claim 1, wherein the first backup application is managed using a virtual environment management platform.

3. The system of claim 1, wherein the first backup application includes a virtual backup appliance.

4. The system of claim 1, wherein the backup was created at a backup interval indicated by a data protection policy.

5. The system of claim 1, wherein the checkpoint backup includes a snapshot of metadata and configuration data of the first backup application that can be used to restore the first backup application to a valid state of a creation time of the checkpoint backup.

6. The system of claim 1, wherein the checkpoint backup is associated with a unique identifier identifying a version of the checkpoint backup.

7. The system of claim 1, wherein the checkpoint backup includes a file directory that includes one or more backup files of the first backup application metadata, configuration data, and other associated data.

8. The system of claim 1, wherein the backup includes an interval backup.

9. The system of claim 8, wherein the interval backup includes changes to data of the first backup application since a previous checkpoint backup.

10. The system of claim 1, wherein the backup includes metadata and configuration data of the first backup application.

11. The system of claim 1, wherein the backup is received from a backup storage of the first backup application.

12. The system of claim 1, wherein the second backup application includes a central backup application.

13. The system of claim 1, wherein the second backup application manages the first backup application and the second backup application manages backups across a local site of the first backup application and a remote site.

14. The system of claim 1, wherein the backup is stored in a de-duplication storage.

15. The system of claim 1, wherein storing the backup using the second backup application includes replicating the backup stored in a storage local to the first backup application to another storage remote from a site of the first backup application.

16. The system of claim 1, wherein storing the backup using the second backup application includes replicating the backup according to a data protection policy at least in part provided by the second backup application.

17. The system of claim 1, wherein the backup was created by the first backup application.

18. A method for protecting a first backup application, comprising;
receiving a backup of a state of the first backup application, wherein the backup of the state of the first backup application includes a checkpoint backup of the first backup application, wherein the first backup application coordinates backup of a virtual environment that includes one or more virtual machines and a data storage associated with the one or more virtual machines, the backup of the state of the first backup application includes an application configuration backup of a configuration of the first backup application, and the backup of the state of the first backup application is separate from a user data content backup generated by the first backup application and stored in the data storage associated with the one or more virtual machines, wherein the backup of the state of the first backup application is stored in a backup storage of the first backup application; and
using a second backup application external to the virtual environment to synchronize the received backup of the state of the first backup application with a state of the second backup application.

19. A computer program product for protecting a first backup application, the computer program product being embodied in a non-transitory computer readable storage medium and comprising computer instructions for:
receiving a backup of a state of the first backup application, wherein the backup of the state of the first backup application includes a checkpoint backup of the first backup application, wherein the first backup application coordinates backup of a virtual environment that includes one or more virtual machines and a data storage associated with the one or more virtual machines, the backup of the state of the first backup application includes an application configuration backup of a configuration of the first backup application, and the backup of the state of the first backup application is separate from a user data content backup generated by the first backup application and stored in the data storage associated with the one or more virtual machines, wherein the backup of the state of the first backup application is stored in a backup storage of the first backup application; and
using a second backup application external to the virtual environment to synchronize the received backup of the state of the first backup application with a state of the second backup application.

* * * * *